Feb. 1, 1966  B. A. WILSON  3,232,021
CEILING STRUCTURE
Filed March 15, 1961  2 Sheets-Sheet 1
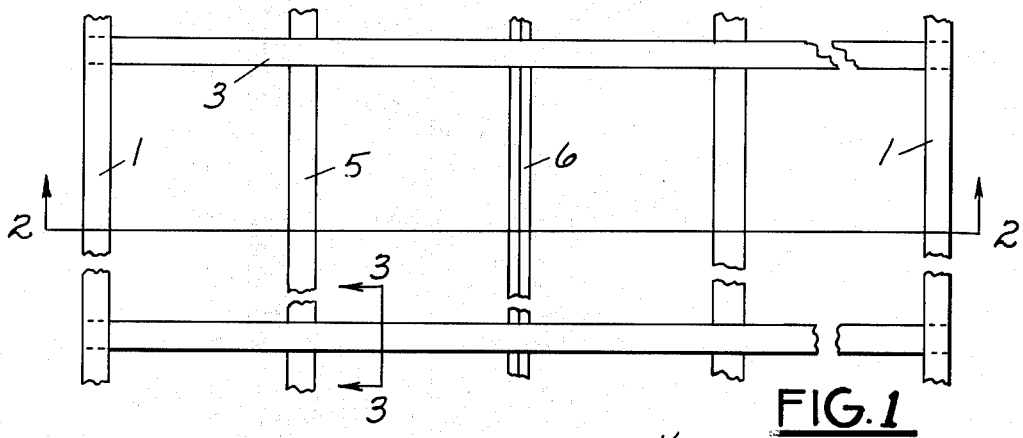
FIG. 1
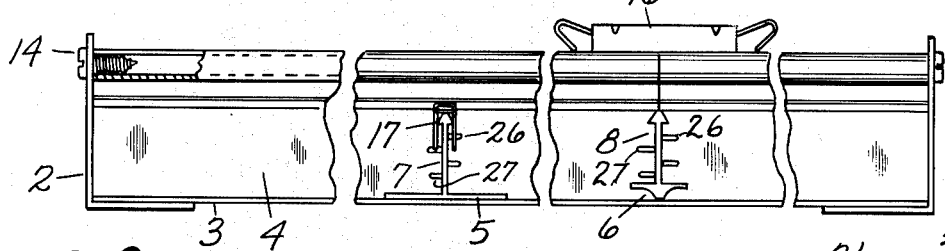
FIG. 2
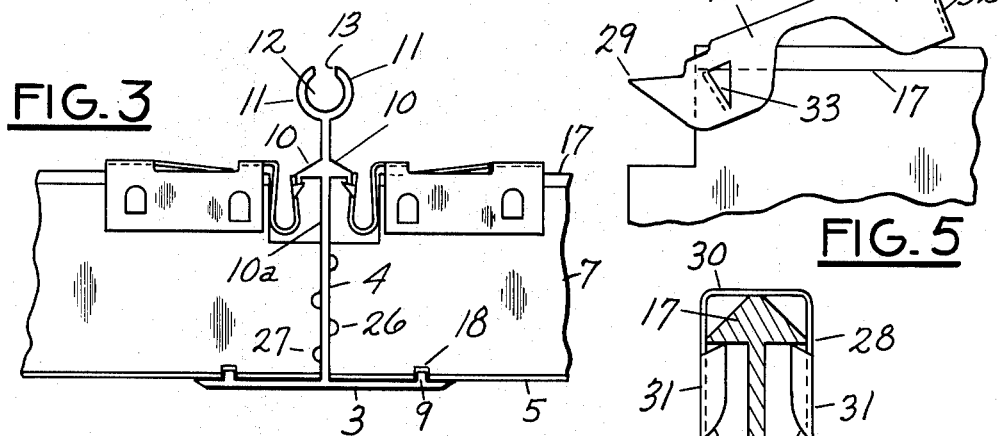
FIG. 3
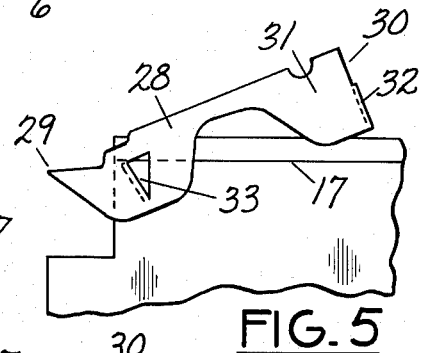
FIG. 5
FIG. 6
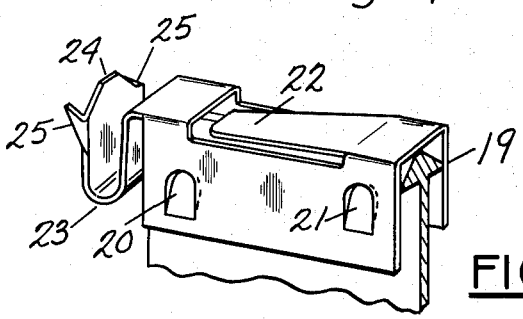
FIG. 4
INVENTOR.
Bertram A. Wilson
BY Ralph Hammar
Attorney Feb. 1, 1966     B. A. WILSON     3,232,021
CEILING STRUCTURE
Filed March 15, 1961     2 Sheets-Sheet 2
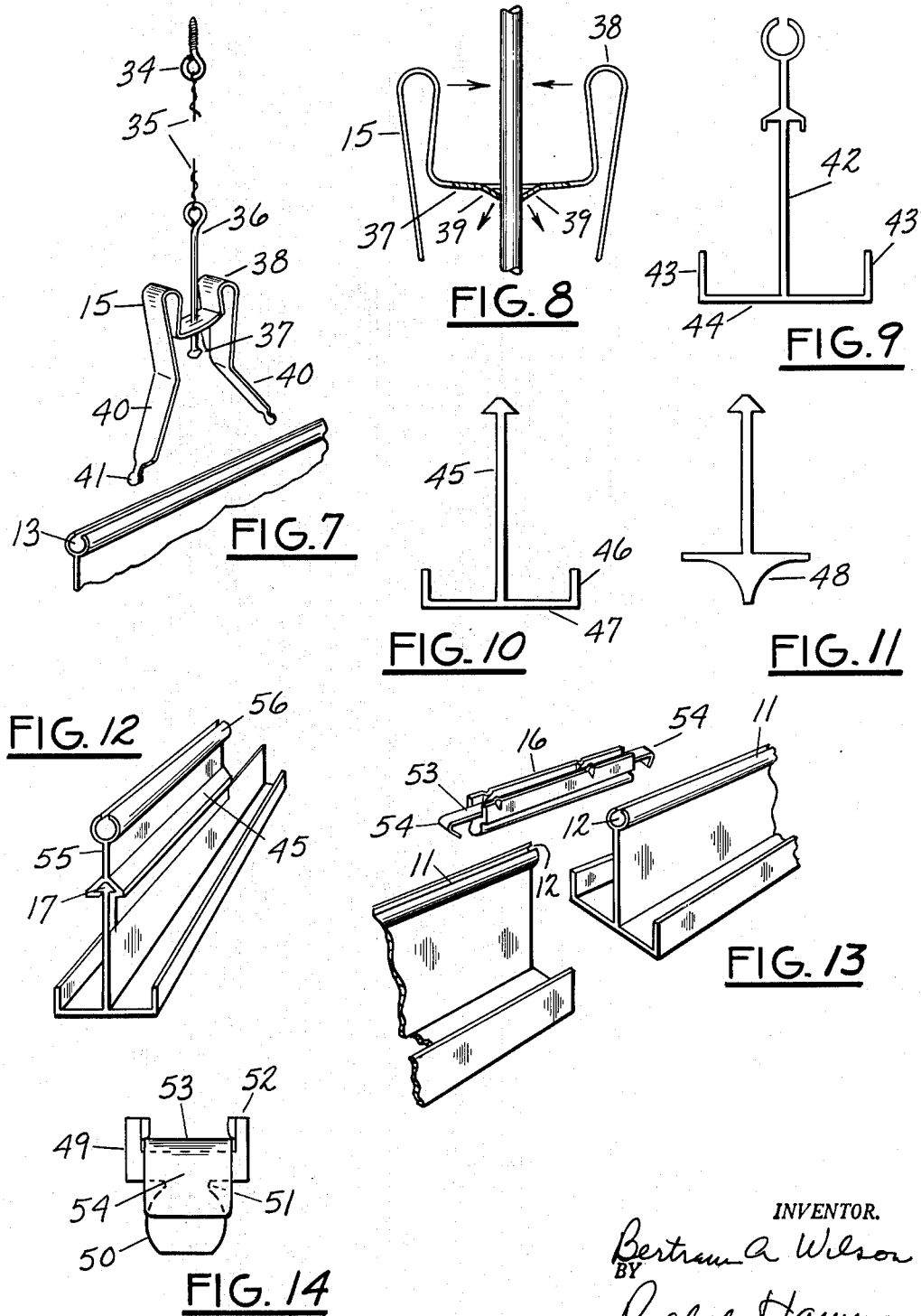

United States Patent Office 3,232,021
Patented Feb. 1, 1966

3,232,021
CEILING STRUCTURE
Bertram Arnold Wilson, 2001 Peninsula Drive, Erie, Pa.
Filed Mar. 15, 1961, Ser. No. 96,032
4 Claims. (Cl. 52—507)

This invention is a ceiling structure especially adapted to the support of light diffusing panels. The structure may be ceiling suspended to provide a full floating section spaced inward from the walls or the structure may be supported at its edges by angles fastened to the walls. The structure is easily installed and may be taken apart and reassembled in a new location.

In the drawing, FIG. 1 is a fragmentary bottom view of a ceiling structure, FIG. 2 is a section on line 2—2 of FIG. 1, FIG. 3 is a section on line 3—3 of FIG. 1, FIG. 4 is an enlarged view of one of the clips for attaching a cross member to a stringer, FIG. 5 is an enlarged view of another clip for attaching a cross member to a stringer, FIG. 6 is an end view showing the FIG. 5 clip in locked position, FIG. 7 is a perspective of one of the adjustable ceiling suspension members, FIG. 8 is an enlarged section illustrating the structure by which the adjustment is obtained, FIG. 9 is a section of an alternative stringer, FIG. 10 is a section of a cross member for use with the FIG. 9 stringer, FIG. 11 is a section of another cross member, FIG. 12 is a perspective of a structure for obtaining additional suspension points on cross members of the structure, FIG. 13 is an exploded perspective of a structure for joining stringers end to end, and FIG. 14 is an end view of the joining member.

When viewed from the bottom, the visible parts are the flanges 1 of angles 2, flanges 3 of stringers 4, and flanges 5 and 6 of cross members 7 and 8. These cooperate to define rectangular openings suitable for edge supporting light diffusing panels.

As shown in FIG. 3, the stringers 4 are of inverted T section with ribs 9 on the upper side and adjacent the outer edges of bottom flange 3, with ribs 10 on opposite sides of vertical flange 10a and with a bead 11 at the uppermost edge of flange 10a. The bead has a groove or keyway 12 with a relatively narrow entrance slot 13. The bead 11 is in function a keyhole slot. It provides a convenient structure for making connections to the stringer. First, self tapping screws 14 screwed into the head connect the ends of the stringers to the angles 2. Second, the bead provides a connection to suspension clips 15 which may be arranged at any suitable spacing along the length of the stringers. Third, the bead receives connectors 16 by which stringers may be connected in end to end relation.

The cross members 7 are also of inverted T section with a bead 17 along the upper edge of the vertical flange. As shown in FIG. 3, each end of a cross member butts against the vertical flange 10a of the stringer 3. In this position, a slot 18 in the base flange 5 of the cross member fits over the rib 9 on the stringer and holds the cross member at right angles to the stringer. On the upper edge of the cross member is a spring clip consisting of a channel section 19 with depending sides straddling the upper edge of the cross member and having on opposite sides inwardly extending portions 20, 21 which in the unstressed position of the clip engage the under side of the rib 17 and limit the upward movement of the clip under the influence of spring finger 22 struck out of the top section. At the front of the clip is a U section 23 having at its outer end an upstanding portion 24 which fits against the rib 10 on the stringer and on opposite sides of section 24 are prongs 25 which hook under the rib 10. It will be noted that the rib 10 is slightly undercut so that the prongs 25 firmly anchor the cross members to the stringer.

To connect the cross members, it is necessary that the front end of the clip be pushed downward until the prongs 25 are below the rib 10. The clip is then pushed forward or toward the rib and the prongs spring up and engage the rib. To disconnect the cross members, the front end of the clip is pushed downward until the prongs 25 clear the rib 10 and the clip is then pushed backward.

To locate the cross members on the runners there are provided spaced rows of alternate indentations and projections 26 and 27 which engage opposite sides of the cross members and hold them in upright position. The indentations 26 on one side of the flange 10a are opposite projections on the opposite side of the flange. As shown in FIG. 2, the projections 26 and 27 are arranged at the extreme ends of the stringers so that when two stringers are connected end to end, a cross member may be located at the joint between the stringers. This is shown for the cross member 8.

An alternate form of clip for connecting the cross members to the runners is shown in FIGS. 5 and 6. This comprises a channel shaped member 28 having at one end points 29 and at the opposite end a handle section 30 with depending sides 31 provided with hook sections 32 which engage under the rib 17 at the upper edge of the cross member. The hook member has indents 33 which engage opposite sides of the vertical flange of the cross member beneath the rib 17 and provide fulcrums for the clip. In the position before installation as shown in FIG. 5, the points 29 of the clip are slightly below the upper edge of the rib 17 and the handle 30 is above the rib 17. After the cross member has been moved into position on the stringer, a positive connection is made by pushing downward on the handle. This causes the points 29 to engage beneath the ribs 10 on the stringer. The clip is locked in this position by engagement of the hooks 32 beneath the rib 10. The clip may be released by spreading sides 31 of the handle until the hooks 32 are clear of the rib 17 and then lifting up on the handle 30.

The suspension shown in FIG. 7 comprises an eye 34 which may be suitably attached to the ceiling framework, a suspension wire 35 and a suspension rod 36 at the lower end of the wire slidably received in an opening in an arched section 37 of the resilient metal suspension clip 15. Spring fingers 39 struck out of the arched section grip the suspension rod when the arched section is in normal position. At opposite ends of the arched section are upstanding loops 38 which when squeezed together bend the arched section to separate spring fingers or prongs 39 from gripping relation with the rod and permit sliding of the rod 36 to adjust the height of the suspension. This permits leveling of the structure after installation. The suspension clip has downwardly extending sections 40 which first converge and then diverge and terminate in key shaped tabs 41 at the lower ends. When the diverging lower ends are squeezed together, the thickness of the tabs 41 is less than the width of the slot 13 in the stringer. By turning the suspension clip so that the plane of the tabs 41 is aligned with the slot, the tabs may be inserted in the slot and then by turning the clip so that the tabs are crosswise of the slot as shown in FIG. 7 and releasing the clip, the lower ends of the clip spring apart and the tabs are positioned in load carrying relation to the stringer. The clip cannot be removed until the steps are reversed.

FIGS. 9 and 10 show other forms of stringers and cross members. The stringer 42 of FIG. 9 has upstanding flanges 43 at opposite ends of the bottom flanges 44. The cross member 45 of FIG. 10 which is to be used with the stringer of FIG. 9 likewise has upstanding flanges 46 at opposite ends of the bottom flanges 47. The cross members are interlocked with the runners in the same way as the previously described construction by a cross slot which receives the upstanding flanges 43 on the stringers. The flanges 43 are similar to the ribs 9 but have a greater stiffening effect.

FIG. 11 shows a section of another cross member in which the lower end is in the form of a decorative bead 48. This cross member may be used with either the stringer of FIG. 3 or with the stringer of FIG. 9. When used with the stringer of FIG. 3, the cross slot will be of sufficient depth to receive the rib 9. When used with the stringer of FIG. 9, the cross slot will be of greater depth so as to receive the flange 43.

It is sometimes necessary to join stringers end to end and for this purpose there is provided a joining clip shown in FIGS. 13 and 14. The clip is made of an extruded aluminum bar 49 having at its underside a circular bead 50 connected to the bar by a neck 51. On the upper side of the bar are upstanding flanges 52 which are staked over a strip 53 of spring metal having at is opposite ends hook sections 54. The circular bead 50 slides into opposite ends of the groove 12 in the upper edge of the stringers which are to be joined. The hook sections 54 engage the upper surface of the beads 11 of the stringers and anchor the clip in place. By lifting up on the hook sections 54, the clip may be readily removed if the structure is to be disassembled.

It is sometimes desirable to provide for additional connections to the cross members. A structure for this purpose is shown in FIG. 12 consisting of an extruded section 55 which slides over the bead 17 at the upper edge of the vertical flange of the cross members. At the upper edge of the section 55 is a bead 56 of the same configuration and having the same function as the bead 11 at the upper edge of the stringers.

What is claimed as new is:

1. A ceiling structure having a framing member with a vertical flange having at its upper edge a bead with a keyway therein having a narrow entrance slot at the top of the bead, a suspension member having resilient arms diverging at the lower ends and terminating in tabs which enter the slot when the lower ends of the arms are squeezed together and turned into alignment with the slot and which form load transmitting connections when the lower ends of the arms are turned crosswise of the slot and released and spring apart.

2. A ceiling structure having a framing member with a vertical flange having at its upper edge a bead with keyway therein having a narrow entrance slot at the top of the bead, a suspension member having resilient arms diverging at the lower ends and terminating in tabs which enter the slot when the lower ends of the arms are squeezed together and turned into alignment with the slot and which form load transmitting connections when the lower ends of the arms are turned crosswise of the slot and released and spring apart, said arms having loops at the upper ends with downwardly extending parts joined to an arched section between the loops, said arched section having an opening receiving a suspension rod and spring fingers struck out of the arched section and arranged to grip the suspension rod when the arched section is in normal position, said fingers being moved away from gripping relation to the suspension rod by bending said arched section by squeezing the loops.

3. A ceiling structure having a framing member with a vertical flange having at its upper edge a bead with a keyway therein having a narrow entrance slot at the top of the bead, a suspension member having resilient arms diverging at the lower ends and terminating in tabs which enter the slot when the lower ends of the arms are squeezed together and turned into alignment with the slot and which form load transmitting connections when the lower ends of the arms are turned crosswise of the slot and released and spring apart, said arms having upper ends connected by an arched section, said arched section having an opening receiving a suspension rod and spring fingers struck out of the arched section and arranged to grip the suspension rod when the arched section is in normal position, said fingers being moved away from gripping relation to the suspension rod by bending said arched section.

4. A ceiling structure having a plurality of spaced stringers each with a vertical flange having at its upper edge a bead with a keyway therein having a narrow entrance slot at the top of the bead, angles abutting the ends of the stringers and secured thereto by screws threaded into the ends of said keyways, suspension members having resilient arms diverging at the lower ends and terminating in tabs which enter the slot in the associated stringer when the lower ends of the arms are squeezed together and turned into alignment with the slot and which form load transmitting connections when the lower ends of the arms are turned crosswise of the slot and released and spring apart.

References Cited by the Examiner

UNITED STATES PATENTS

| | | | |
|---|---|---|---|
| 1,265,990 | 5/1918 | Benner | 52—738 |
| 2,267,379 | 12/1941 | Tinnerman | 52—717 |
| 2,303,269 | 11/1942 | Goss | 189—36 |
| 2,367,659 | 1/1945 | Burke | 85—36 |
| 2,376,279 | 5/1945 | Schlenkert | 52—509 |
| 2,382,583 | 8/1945 | Scheyer | 52—738 |
| 3,017,973 | 1/1962 | Schwartz | 52—656 |
| 3,055,469 | 9/1962 | Byssing et al. | 52—475 |

RICHARD W. COOKE, JR., *Primary Examiner.*

CORNELIUS D. ANGEL, *Examiner.*